Oct. 2, 1951 — E. J. RABENDA — 2,569,830
ACCOUNTING MACHINE WITH MEANS FOR HANDLING
POSITIVE AND NEGATIVE BALANCES
Filed March 4, 1950 — 10 Sheets-Sheet 1

INVENTOR
EDWARD J. RABENDA
BY
J. W. Lowmiller
ATTORNEY

Oct. 2, 1951     E. J. RABENDA     2,569,830
ACCOUNTING MACHINE WITH MEANS FOR HANDLING
POSITIVE AND NEGATIVE BALANCES
Filed March 4, 1950     10 Sheets-Sheet 2
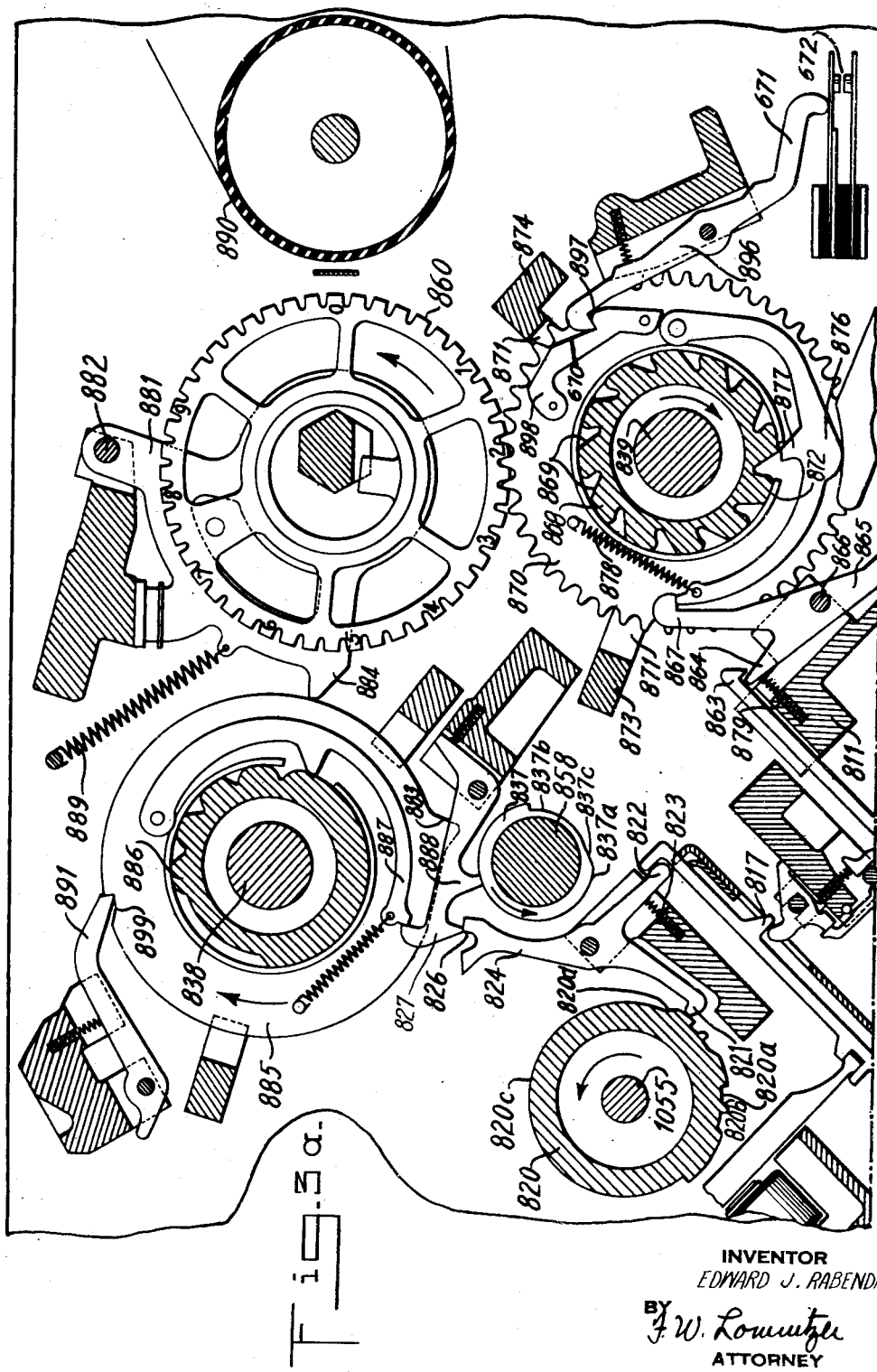
INVENTOR
EDWARD J. RABENDA
BY
F. W. Lommitzer
ATTORNEY

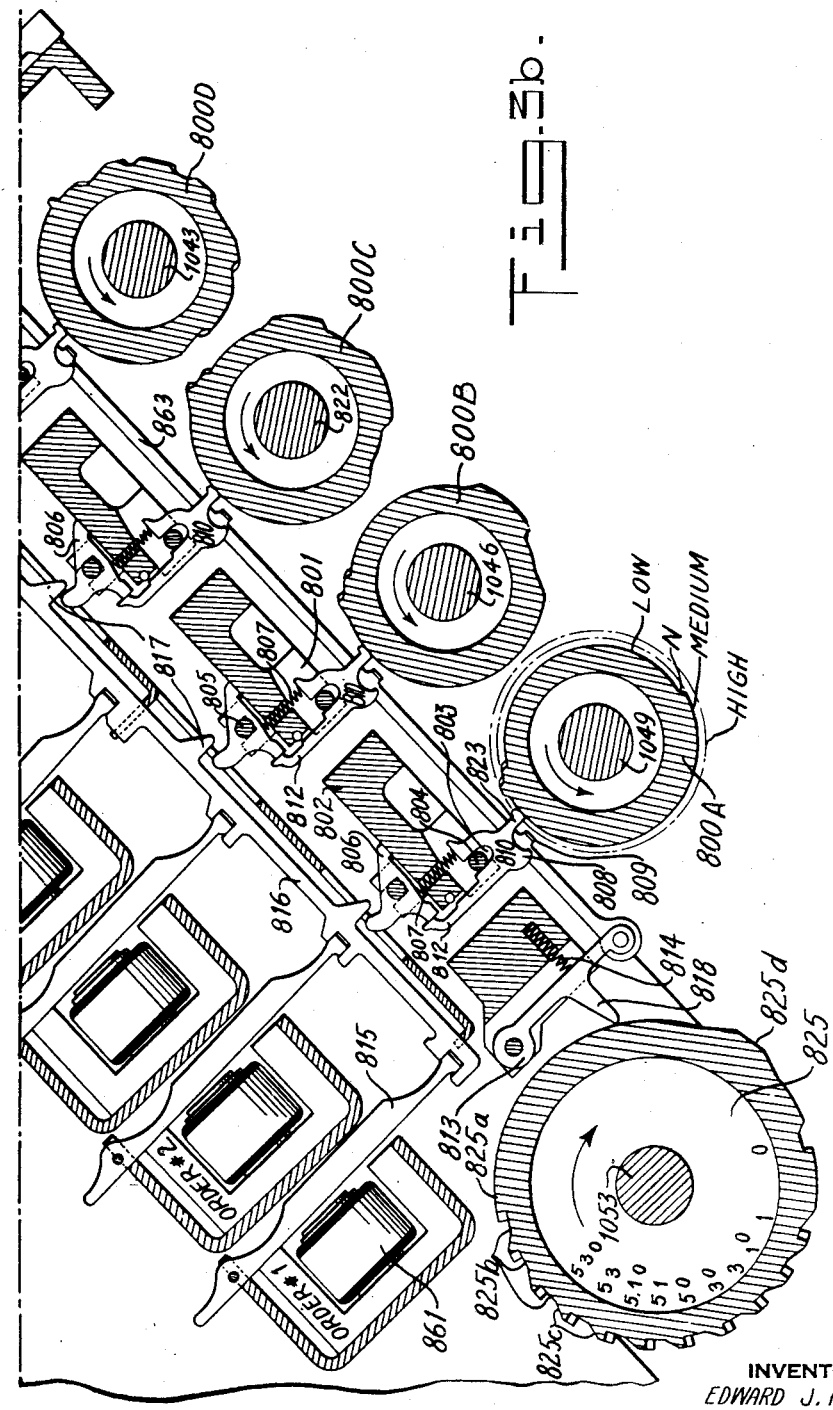

Oct. 2, 1951     E. J. RABENDA     2,569,830
ACCOUNTING MACHINE WITH MEANS FOR HANDLING
POSITIVE AND NEGATIVE BALANCES
Filed March 4, 1950     10 Sheets—Sheet 4

INVENTOR
EDWARD J. RABENDA
BY
J. W. Lowrutzu
ATTORNEY

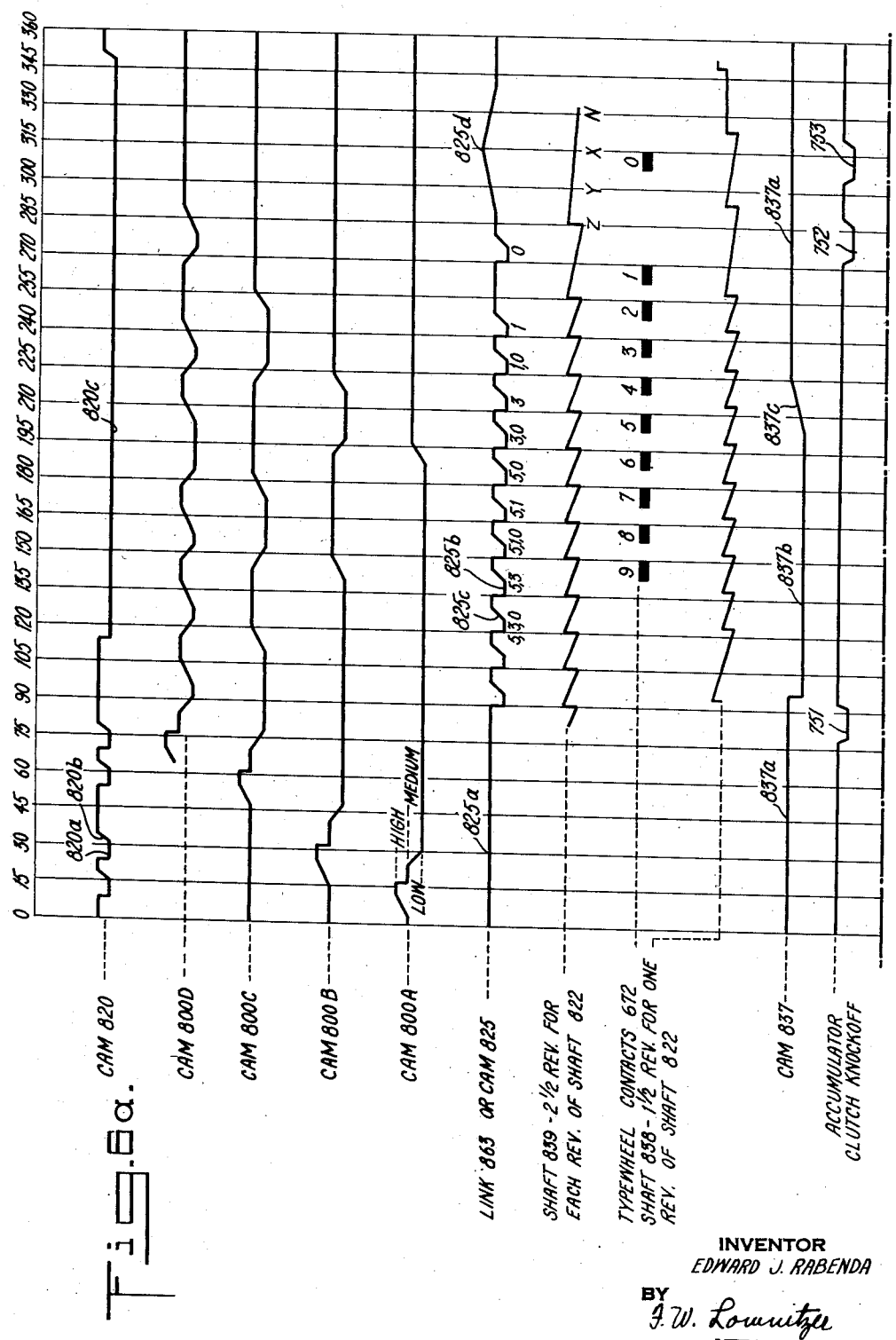

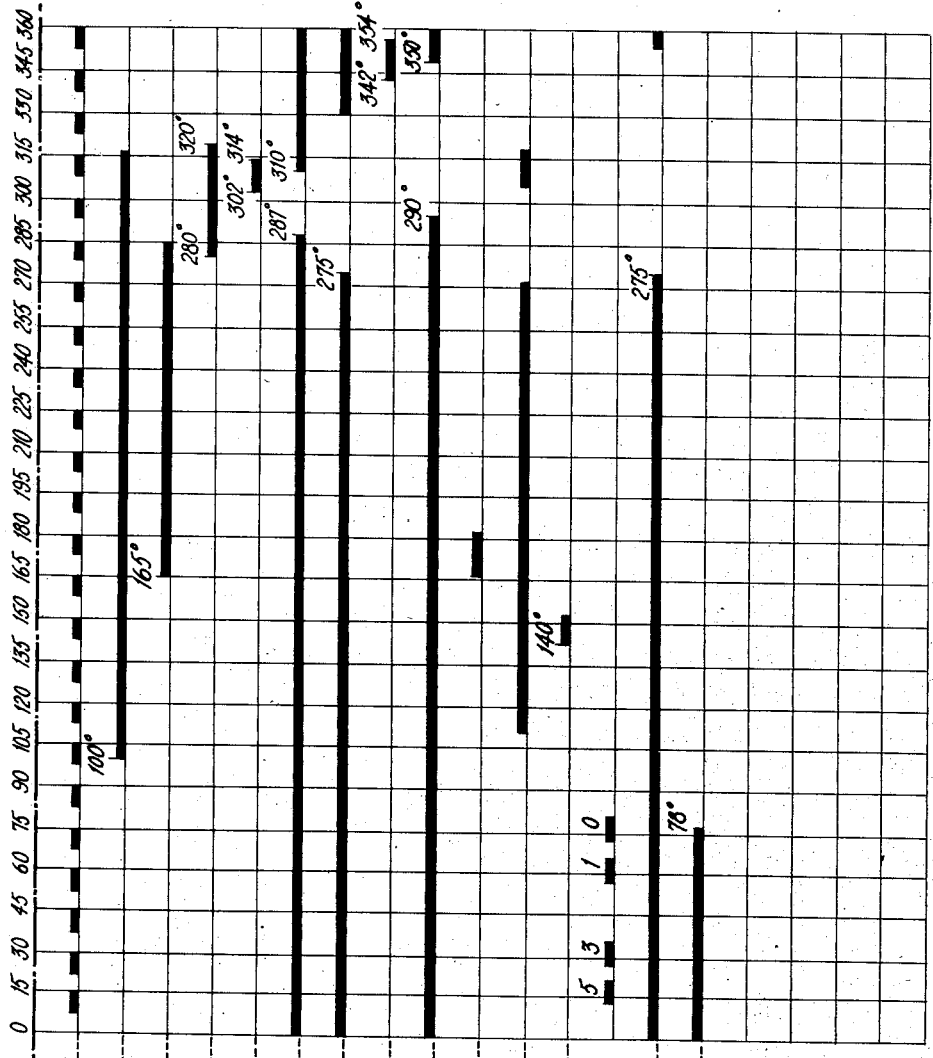

Patented Oct. 2, 1951

2,569,830

UNITED STATES PATENT OFFICE 2,569,830

ACCOUNTING MACHINE WITH MEANS FOR HANDLING POSITIVE AND NEGATIVE BALANCES

Edward J. Rabenda, Poughkeepsie, N. Y., assignor to International Business Machines Corporation, New York, N. Y., a corporation of New York Application March 4, 1950, Serial No. 147,639

9 Claims. (Cl. 235—61.8)

This invention relates to accounting machines and more particularly to the type which provides for printing of positive and negative balances as a true number whether such balances are positive or negative in character.

To better understand the nature of the present improvement it is explained that when an accumulator having electrical readouts is utilized to represent a positive balance or a negative balance the extreme highest order is usually reserved for 9's detection which would characterize a negative balance, such as –99834–, the true number balance being –00165–, or the nines complement of each digit. In the present machine the negative balance detection is divorced from this readout order and placed upon the customary "9's" transfer contact. In the present machine the customary "inversion relay" is also utilized before reset of the accumulator to transmit "nines" complementary digits and is selected for operation by such "9's" transfer contacts. This is the condition of the machine when arranged for "Negative Balance ON." In this condition all orders of the accumulator may be used for receiving negative and positive amounts except the order at the extreme left. Thus, for a five order accumulator the number –99999– can be accumulated, which for a negative balance would be printed as a zero balance –00000– by the printing mechanism. Following balance printing operations, there is an automatic reset of the accumulator which brings all elements back to their reset position, and in the present machine is indicated by closure of all 9's transfer contacts and an accompanying "9" digit representation in each order of the readout.

When it is known in advance that the accumulation of additive and subtractive amounts will not result in a negative balance a feature of the present invention herein enables the machine to be conditioned for "Negative Balance OFF" and by a novel arrangement the maximum accumulating capacity for all orders is not only attained by enabling the order usually reserved for negative balance detection for accumulation of digits, but the inversion relay is selected for operation for printing a zero balance after reset of the accumulator. The latter operation is necessary because herein the accumulator orders reset to nine.

A still further feature of the invention is the attainment of the maximum accumulating capacity of a predetermined number of accumulator orders by placing the selection of the inversion relay for zero balance printing before reset of the accumulator under control of all the 9's transfer contacts of the accumulator, thus enabling all orders of the readout to be utilized for digit readout purposes.

Another feature of the invention relates to the automatic printing of a balance when the machine is conditioned for "Negative Balance OFF" and the balance results in zero, reflected by –99999– in all orders of the readout, and the closure of all 9's transfer contacts. This is especially useful when it is desired to pass a series of cards through the machine which represent equality in positive and negative amounts to prove this zero balance. In other instances it may be desired to print such zero balance whenever, unknown to the operator, such a balance may be reached. Hence, it will be seen that with the machine conditioned for "Negative Balance ON" the single 9's contact picks up the inversion relay before a total and reset operation (as well as after the first total and reset operation to print the zero balance) and for "Negative Balance OFF" all of the 9's transfer contacts pick up the inversion relay after a total and reset operation. These two differently timed controls by these 9's contacts enables not only the necessary operations for printing balances as a true number but by divorcement of these controls from the readout orders the maximum accumulating capacity of a predetermined number of accumulator orders may be attained in a "Negative Balance OFF" condition.

Other objects of the invention will be pointed out in the following description and claims and illustrated in the accompanying drawings, which disclose, by way of example, the principle of the invention and the best mode, which has been contemplated, of applying that principle.

Figs. 3a and 3b when assembled comprise a side elevational view of one order of the printing mechanism and also show the rotary translator and the converter for converting combinational hole impulses derived from the accumulator readout to a differentially timed equipment.

Figure 4:
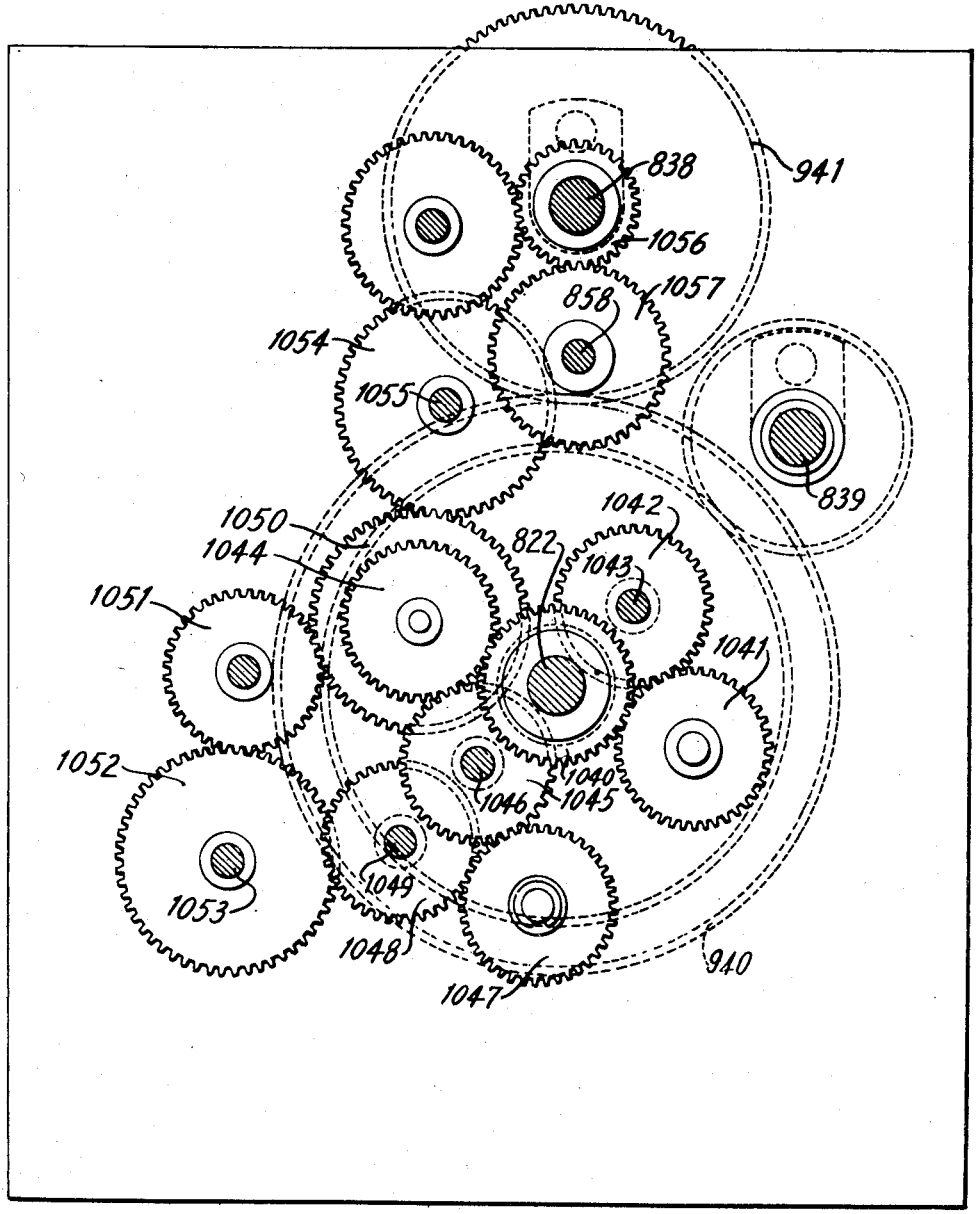

Fig. 4 is a side elevational view showing the gearing for the drive shafts shown in Figs. 3a and 3b.

Figs. 5a, 5b, 5c, and 5d when assembled side by side in the named order constitute the wiring diagram of the machine.

Figs. 6a and 6b constitute the timing diagram.

*Additive and subtractive entries*

The present improvement is preferably incorporated in an accounting machine of the record controlled type, in which entries are made either additively or subtractively for positive or negative amounts, respectively, to obtain either a debt or credit balance of such entered amounts. A credit balance is assumed to represent a total when the negative amounts numerically exceed the positive amounts, and a debit balance, the reverse. Any suitable form of entering mechanism may be provided, as there are many and well known types disclosed in the prior art. Since the entering mechanism forms no part of the present invention and since any suitable type may be coordinated therewith it is not disclosed in detail herein. Suffice it to say that the amounts are preferably represented upon perforated records, positive amounts being entered additively, and specially designated records causing negative amounts to be entered subtractively. In additive entering operations an accumulator clutch magnet AM (Fig. 1) is energized at a differential time so that the associated accumulator wheel will be turned a number of steps commensurate with the digit represented in the related column of the record. A mechanical or electrical knockoff is then operative to disengage the accumulator clutch and the wheel will have received the proper digit entry.

In subtracting operations a record which is to represent a negative, or subtractive amount, has a special hole at the X index point position which causes a modification of the entering circuits so that the amount is substractively entered. This principle of operation is well known. In the beginning of the cycle of the operation of the machine all of the advance magnets AM (Fig. 1) are energized which will cause the engagement of all the accumulator clutches to cause the initiation of rotation of each of the accumulator wheels. A differentially timed impulse is derived from the record according to the location of the perforation, which impulse then causes the energization of the stop magnet SM (Fig. 1) of the related accumulator wheel. This will cause the disengagement of the accumulator clutch and the related accumulator wheel will now have received a nines complement digit entry.

Since subtraction is preferably effected in the basic machine by the complemental process, i. e. by entry of the "nines" complement of each digit of the amount to be subtracted, it is necessary to effect, at times, the entry of a fugitive unit when the highest order wheel goes from 9-0. As is well known, the carry mechanism of this order is the instrumentality to cause the units carry in the units order at such times, thereby entering the fugitive unit. Since this arrangement is very well known it is not shown or described herein and for a more complete understanding of the operation of this portion of the machine reference may be had to the patent to H. S. Beattie, No. 2,439,445.

*The accumulator*

Figure 1:
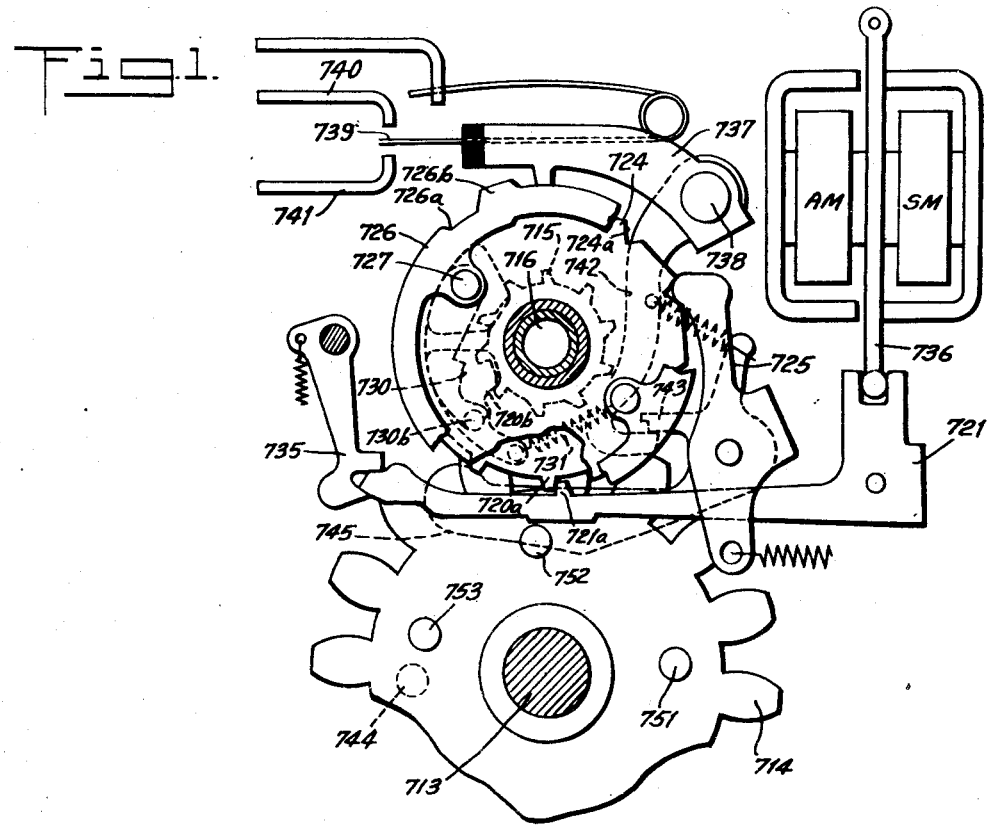
Fig. 1 is a sectional elevation view of one order of the accumulator of a preferred form of accumulator with start and stop magnets and carry contacts.
Figure 2:
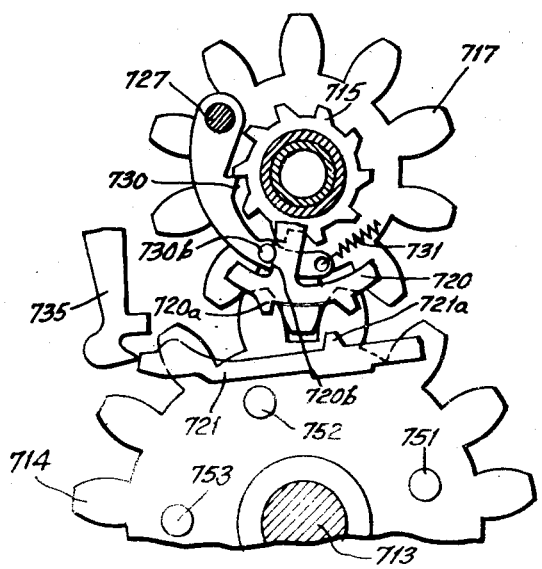
Fig. 2 is a sectional elevation view of an accumulator wheel and associated clutch engaging mechanism.

In Fig. 1 the driving shaft 113 is suitably geared to the card feed rollers so as to make one revolution for each cycle of operation. For each denominational order of the accumulator this shaft 113 has a gear 114 secured thereto which drives the adding clutch mechanism. The accumulator and clutch driving mechanism is of the same construction as shown in Lake et al., Patent No. 2,328,653 and Daly, No. 2,377,762 and includes a ratchet 115 which is free on post 116 and integral with a gear 117 driven by gear 114 (Fig. 2). Rotatably carried by post 116 is a disk 120 having ten teeth 120a adapted to be engaged by a tooth 121a on the long arm of a clutch lever 121 to hold the disk against rotation in a counterclockwise direction.

At the side of disk 120 is a register or adding wheel 124 rotatable on post 116 and provided with ten peripheral notches 124a. Wheel 124 may take any of ten rotative positions with the values 0, 1 . . . 9. A spring-pressed lever 125 engages with a notch 124a of wheel 124 to hold the wheel impositively and to center it in the value position into which it has been rotated. A transfer cam 126 is fixed to the side of wheel 124 and a stud 127 in wheel 124 extends through an opening in disk 120 to pivotally carry a clutch dog 130. A spring 131 urges the tooth of dog 130 to engage ratchet 115. In the position shown in Fig. 1 the clutch lever 121 is in declutching position, its tooth 121 is restraining rotation of disk 120 counterclockwise and dog 130 is clear of ratchet 115. The dog 130 is being held clear of the ratchet by coaction of a pin 130b on the dog with a cam edge 120b of disk 120.

When the clutch lever 121 is dropped to cause its tooth 121a to release the disk 120 for counterclockwise movement, the spring 131 is effective to rock the dog 130 into engagement with ratchet 115. During this movement of the dog 130 its pin 130b rides along the cam edge 120b and cams the disk counterclockwise until its tooth 120a previously engaged by tooth 121a is to the right of the latter tooth. The parts are then in the clutching position shown in Fig. 2, and the register wheel 124 is coupled to the driving device 115, 117 for rotation. Through engagement of the pin 130b of the dog 130 with cam edge 120b, the disk 120 is forced to rotate counterclockwise together with the register wheel.

When the clutch lever 121 is returned to upper declutching position, its tooth 121a intercepts a tooth 120a of disk 120 and stops the disk. Register wheel 124 and dog 130 continue rotating while cam edge 120b of disk 120 cams the pin 130b outwardly until it is again in its outer position. As the pin 130b is cammed outwardly clutch dog 130 moves clear of ratchet 115 and declutches the register wheel from the driving means. The register wheel is then held and centered in its new value position by lever 125. A spring-urged latch 135 serves to hold lever 121 in either clutching or declutching position.

The clutch lever 121 has a short arm swiveled to the lower end of an armature 136 which is disposed between an advance magnet AM and a stop magnet SM. Energization of magnet AM rocks armature 136 clockwise to lower lever 121, and energization of magnet SM rocks armature 136 counterclockwise to raise the lever 121.

When the wheel 124 is in its 0, 1 . . . 8 positions, the cam 126 holds a carry lever 137 pivoted at 138 in the position shown in Fig. 1, where a contact blade 139 (insulated from lever 137) takes a midposition between contact elements 140 and 141. When the wheel is in its 9 position a tooth on lever 137 is dropped into a cut 126a of cam 126 and blade 139 contacts element 141. When the wheel 124 passes from the 9 to 0 position a rise 126b rocks lever 137 to cause blade 139 to engage element 140. When the lever is so rocked an arm 742 integral therewith is engaged and held by a spring-urged latch 743 which maintains the contact engagement between 739 and 740 until a pin 744 in gear 714 strikes an arm 745 integral with the latch 743 to release lever 742. The point in the cycle at which such unlatching occurs is indicated in the time chart. The accumulator is also provided with a mechanical knockoff or declutching mechanism which comprises three pins 751, 752 and 753 secured to the side of gear 714 and adapted during rotation of gear 714 to ride in succession under an edge of clutch lever 721.

Assume the clutch lever to be in lower position, when either pin 751, 752 or 753 engages lever 721, it cams it upwardly into the position of Fig. 1. The knockoff pins 751, 752 and 753 are effective at fixed points of the cycle as indicated in the timing diagram of Fig. 6a.

Automatic group control circuit

It is desirable that the record controlled machine in which the present invention is incorporated be provided with an automatic record group control device which is operative to automatically initiate a total taking operation (balance printing operation) in the manner to be subsequently described. To this end it is preferable that such group control mechanism comprise the arrangement shown in the application of Edward J. Rabenda et al., Serial No. 49,256, filed September 14, 1948, now Patent No. 2,521,408, issued September 5, 1950.

As a result of a group change in numbers the minor relay MI (Fig. 5d) will be energized to close its MI-4 relay contacts. With such contacts closed a circuit is completed from the line side 615, CR48 cam contacts, MI-4 contacts, pickup coil P of PI relay, to line side 616. The H coil of the PI program relay is held energized through the PI—I relay contacts, and CR50 cam contacts back to line side 615. Said contacts PI—I also shunt CCI relay coil across PIH holding coil, and thus CCI relay coil is held energized with the PI program relay coil.

At the end of the cycle in which a change in group numbers is detected, cam contacts CR58 (Fig. 5a) close to complete a circuit from the line side 615, through relay contacts CCI—I, STR subtotal-reset relay to line side 616. Thus, from the timing of CR58 (Fig. 6b), it is evident that the STR relay is held energized until about 275° of the next cycle, or the one in which a total or balance printing operation occurs. STR relay closes the STRI, U, T, H, TH relay contacts (Figs. 5b, 5c) to connect all orders of the readout RO with all the translator and converter magnets 861. The circuits of the machine are now conditioned for printing a total or balance and for the present it will be assumed that such total is a positive balance which is the case where only additive amounts have been added, or in the event that subtraction has been performed, the added amounts are greater than the amounts which have been subtracted. This condition is known hereinafter as "Negative Balance OFF."

Total printing is under control of an electrical readout which is preferably constructed in the manner now to be described. Only four orders are shown to simplify the drawings.

Total readout

The accumulator shown herein is provided with an electrical total readout which may be of the form shown and described in the patents to C. D. Lake et al., No. 2,232,006 and No. 2,138,636 and G. F. Daly, No. 2,377,762. Since the construction of the electrical total readout is well known in the art it is only shown diagrammatically in the wiring diagram of Figs. 5b and 5c. As shown therein rotatable with an accumulator wheel of each order is a brush 663 which makes contact with a common segment 662 and with one or another of the digit segments 661 according to the digit representation of the accumulator order. The same digit segments 661 are interconnected by wires 664, or they may be strips also engaged by brushes 663. The digit segments receive digit impulses 5, 3, 1, 0 transmitted by cam contacts CR97—CR106 and according to the digit positions of each readout order, selected impulses 5, 3, 1, 0 are transmitted to a combinational code translator, and converted thereby to a decimal digit equivalent to select the digits to be printed.

Translator and total digit printing mechanism

The present machine is provided with a printing mechanism which is adapted to print the total or balance of amounts entered in an accumulator. As will be clearer later on the total on the accumulator is not read out from the readout as decimal representations but by combinational coded representations which are translated to the decimal equivalents by a translator which will now be described.

Reference character 822 (Fig. 3b, Fig. 4) represents a shaft which is rotated one revolution for each machine cycle. The customary shaft which drives the card feed mechanism is driven by shaft 822, and interposed between the card feed shaft and shaft 822 is the usual card feed clutch which is engaged by the energization of the usual CF clutch magnet (not shown). The card feed clutch is well known and CF magnet corresponds to card feed clutch magnet 48 of Fig. 6 of Patent No. 2,042,324.

There will now be described the translating or converting mechanism which converts the combinational digit representations transmitted under control of the readout to a decimal equivalent which is necessary to select digit type to print the digits of the total.

Cams 800A, 800B, 800C and 800D (Fig. 3b) are driven by driving means to be subsequently described one revolution for each cycle of operation of the machine. It will be noted that these cams differ in their cam contours and the particular cam portion which is effective in each point of the operating cycle is shown in the timing diagram of Fig. 6a. Each of the cams is provided with cam heights which are identified by three dotted circles associated with the cam 800A, which circles are of three different diameters and represent the heights of the cam contours or Low, Medium and High. The corresponding designation is shown in the timing diagram of Fig. 6a for such cams to identify the particular cam portion effective in each point of the operating cycle. The cams 800A, 800B, 800C and 800D may for convenience in construction be extended longitudinally to provide fluted cam rods having the configuration and outline in Figs. 3a, 3b to cooperate with a plurality of orders.

Each cam 800 cooperates with a related releasing and blocking member 810. The reason that the member 810 is called a releasing member is that when elevated a predetermined distance by the Medium or High cam portion of the related cam 800 it will release the operating link 863 for movement but when in its normal lower position (due to the Low cam portion) it will block the link 863 against movement. Each member 810 is slidably mounted in a slot 801 of a guide block 802 and is further guided by a rod 804 which receives a guide slot 803 of the related member 810. Also pivoted on a rod 805 carried by the block 802 is a latch pawl 806. Interposed between the pawl 806 and the associated member 810 is a compression spring 807, the spring 807 functioning to urge the member 810 downwardly so as to always press against and contact with the cam contour of the related cam 800. Each member 810 is provided with a shoulder 808 cooperating with a lug 809 formed as an integral part of the link 863.

The link 863, referring to Fig. 3a, is slidably mounted in guide slots formed in a support plate 811 to support the link 863 at one end and guide its movement, and referring to Fig. 3b the other end of the link 863 is dependently hung by arm 813, which arm has a cam follower extension 818. A compression spring 814 fitting in a spring support and guide block for arm 813 urges the link 863 to the left and when such spring is effective for action under control of a cam 825 it serves as the source of mechanical impulse transmitted to link 863 at a differential time to rock a clutch release arm 867 to engage a clutch to initiate rotation of a type wheel.

Recalling now that each cam 800 has cam contours of three different heights, it should be observed that when member 810 is at a position determined by the low portion of the cam 800 the shoulder 808 abuts lug 809 to block the link 863 from movement to the left, urged by compression of the spring 814. In attempting to do so lug 809 will bear against the shoulder 808 and urge the member 810 clockwise, which movement is restrained by the cooperation of an upstanding hooked portion 812 of member 810 against the latching end of the pawl 806. Assuming now that a cam has been rotated so that the Medium cam portion of the cam contour has raised the member 810, such difference in cam height with respect to the Low cam height will elevate shoulder 808 slightly further above the related lug 809 and by the continued cooperation of the hooked extension 812 of the member 810 with the extremity of the pawl 806, clockwise movement of the pawl 810 will still be restrained.

Assuming now that the High cam portion has positioned the member 810 to its maximum height, the shoulder 808 will be still further above the lug 809 and the member 810 is now in such position that the compression spring 807 will be effective to rock the member 810 clockwise so that a hooked extension 812 will catch over the latch end of pawl 806, provided that at this time the pawl 806 is rocked counterclockwise due to the transmission of an impulse to magnet 861 at the time the member 810 is in its highest position. If the pawl 806 is not rocked slightly counterclockwise, no latching of the member 810 will take place. Summarizing, whenever the High portion of a cam has elevated a member 810 to the highest position such member will be latched if the related pawl 806 is concurrently rocked to latching position. If there is no rocking of the pawl 806 at this time member 810 will not be latched, and will be subsequently free to move up and down in accordance with the successive cam contour as the related cam 800 rotates.

The above description has been confined to the operation of the parts under control of the cam 800A but it should be noted that identical operations are effected under control of the remaining cams 800B, 800C and 800D. For this reason, the description of operation need not be repeated for duplicate parts.

For the purpose of rocking the pawls 806 to latch those members 810 which are at their highest position it will be seen that referring to Fig. 3b each translator control magnet 861 when energized attracts an armature 815 and rocks the same so as to shift a related connected link 816 to the left. Extending from the link 816 are four integral extensions 817, each of which cooperates with the related pawl 806. The result of this construction is that the impulse directed to the magnet 861 will shift the link 816 and rock the four pawls 806 concurrently but only that pawl 806 is effective for latching the related member 810 if the associated member 810 has been elevated to its highest position. Therefore, one or more of the pawls 806 may be rocked idly at the same time without latching the related members 810.

To prevent the armature 815 from sticking to the core of the magnet 861 due to residual magnetism, it is desirable to provide means to positively restore the link 816 and armature 815 to normal by mechanical means timed with the rotation of the cams 800. To this end there is provided a magnet knockoff cam 820 (Fig. 3a) notched as shown. A follower arm 821 of a clutch release arm 824 cooperating with the cam 820 has a depending arm 822 urged by a spring 823 against an upstanding finger of the link 816. At the time the magnet 861 is energized it will be observed that follower arm 821 cooperates with a notch 820a of the cam 820. Thereafter, such arm cooperates with the following cam portion 820b to rock arm 821, link 816 and armature 815, restoring the armature 815 to normal if it should remain attracted to the core under the above circumstances.

Referring now to Fig. 6b, it is obvious that at the time the impulses 5, 3, 1, 0 are directed by cam contacts to be described to magnets 861, one of the cams 800 will have its High portion in cooperation with the latching members 810. For example, at the time the 5 impulse is directed, the High portion of cam 800A will be effective. At the time the 3 impulse is directed only cam 800B will have a High portion effective at this time. For all of the electrical impulses 5, 3, 1, 0, this condition may be represented by the following table:

| IMPULSES | MEMBERS 810 LATCHED |
|---|---|
| 5 | 810A |
| 3 | 810B |
| 1 | 810C |
| 0 | 810D |

It is obvious from the above table that members 810 are latched singly or in predetermined combinations, according to the code so that at the termination of the transmission of the electrical impulses 5, 3, 1, 0 all or some of the members 810 will be latched, and others will not be latched and therefore free to be positioned according to the contour of their cams during their subsequent rotation. It is explained that once a member 810 is latched it is not free to thereafter move upwardly and downwardly in accordance with the subsequent cam contour of the related cam, but remaining unlatched members 810 can do so.

Movement of the operating link 863 to the left during the time that the 5, 3, 1, 0 impulses are transmitted, which movement might be permitted if all of the four members 810 for this order may be either latched or elevated so as to be above the lugs 809, is restrained by a cam portion 825a of cam 825 (Fig. 3b). This cam, through driving means to be subsequently explained, is driven synchronously with the cams 800 and 820 and cooperates with the follower extension 818 of arm 813. As shown in the timing diagram, during the transmission of 5, 3, 1, 0 impulses, the High portion 825a of cam 825 will restrain movement of the operating link 863 to the left.

After latching of members 810 in predetermined combinations the contour of the cams 800A, 800B, 800C and 800D which are thereafter effective will determine the time in the operating cycle that the operating link 863 will be moved to the left in a manner now to be described in detail:

After one or more members 810 are latched in combination according to the impulses transmitted as indicated in the preceding table, the further rotations of the cams 800A, 800B, 800C, 800D will raise and lower the remaining unlatched members 810 according to the cam contours of the respective cams, but during said further rotation of the cams the link 863 will be restrained against movement by one or more of such unlatched members until a point is reached in the operating cycle when the cams related to the unlatched members concurrently present cam operations of Medium height to the unlatched members. It will be recalled that since the latched members 810 are so positioned that they do not restrain the movement of the link 863 under the influence of the spring 814 and further the elevation of any unlatched member by a cam portion of Medium height will also unlock the link 863, it is obvious that when both of these conditions exist for four of the members 810, the link 863 is then free to move under the influence of the spring 814 and cam 825. This will be made clear by reference to a particular example.

If, for example, the 5, 3, 0 impulses (representing 9) are transmitted under control of a readout order when it represents 9 members 810A, 810B and 810D are latched due to the High cam portions of their respective cams 800A, 800B and 800D and such latching of members 810A, 810B and 810D is completed about 75° of the operating cycle (see Fig. 6a). At this time, the members 810A, 810B and 810D are latched in the highest position so that they unlock the operating link 863 at such positions. However, cam 800C in its subsequent rotation continues to lower and raise the related unlatched member 810C and such unlatched member 810C will restrain the operating link 863 from movement until about 123° of the operating cycle, at which time cam 800C through its Medium high cam portion shifts related latching members 810 to unlock the link 863. At this time cam follower extension 818 of the arm 813 will cooperate with the notch 825b designated 5, 3, 0 in both Fig. 3b and the timing diagram of Fig. 6a. Operating link 863 is now unlocked at four points and the movement of the link to the left is effected at about 123° by spring 814. The link will now operate the clutch release arm 867 and therefore engage a type selecting clutch to be described to initiate the rotation of the printing wheel 860 to select the numeral type 9.

Reverting now to Fig. 3b, when the operating link 863 is moved to the left to effect the engagement of the type selecting clutch the cam follower extension 818 is in the bottom of the notch 825b of the cam disk 825 and further rotation of the cam 825 in a clockwise direction will, through the following inclined cam portion 825c, cooperate with the cam follower extension 818 to positively restore the operating link 863 to the right without, however, causing the unlatching of any latched member 810. At about 315° an extra High cam portion 825d will shift link 863 to the right beyond the normal position, and in so doing for those members 810 which have been latched lug 809 will engage the shoulder 823 of the respective member 810 to rock the same counterclockwise to unlatching position, spring 807 being compressed during this operation to rock pawl 806 to normal position. With respect to any unlatched member 810, movement of the link 863 to the right at this time may also effect movement of such members 810 but the operation of such is ineffective.

While the operation of the machine has been described in connection with the manner of engaging the type wheel clutch when the 5, 3, 0 impulses are transmitted, to select the 9 type when a readout order represents 9, the same principle of operation for effecting the above results is involved for other combinations of impulses as is evident from the following table:

| Readout Digit Representation | Impulses Transmitted | Members 810 Latched | Cams 800 at MEDIUM Cam Portion |
| --- | --- | --- | --- |
| 9 | 5, 3, 0 | 810A, 810B, 810D | 800C |
| 8 | 5, 3 | 810A, 810B | 800C, 800D |
| 7 | 5, 1, 0 | 810A, 810C, 810D | 800B |
| 6 | 5, 1 | 810A, 810C | 800B, 800D |
| 5 | 5, 0 | 810A, 810D | 800B, 800C |
| 4 | 3, 0 | 810B, 810D | 800A, 800C |
| 3 | 3 | 810B | 800A, 800C, 800D |
| 2 | 1, 0 | 810C, 810D | 800A, 800B |
| 1 | 1 | 810C | 800A, 800B, 800D |
| 0 | 0 | 810D | 800B |

It will be recognized from this table that the concurrent position of cams 800 at a Medium height cam portion for those cams which have not previously latched members 810 will determine the time the mechanical impulse is transmitted.

The mechanical impulse transmitted to link 863 causes the engagement of a clutch to rotate a printing wheel 860 to a selected digit position.

When the clutch is engaged it is driven by a shaft 839, rotated by means to be later described.

For each printing order there is pivoted on a rod 866 a triple arm member consisting of arms 864, 865 and a clutch release arm 867.

Shaft 839 has secured thereto a tube 868 which is fluted transversely along its periphery to provide clutch notches 869. Tube 868 constitutes the driving clutch member. Encircling the clutch tube 868 is a plurality of gears 870, there being one gear for each order of the printing mechanism. For mounting the gears 870 on the clutch tube 868 each gear has integral therewith a flange 872. To provide for the lateral spacing between the gears 870 the gears are guided by guide slots 871 formed in guide blocks 873 and 874. By such spacing members the gears 870 are separated to allow independent rotation and to also locate a clutch pawl 876 which is pivoted on the related gear to cooperate with the clutch release arm 867. The clutch release arm 867 normally holds the clutch pawl 876 in such position that its tooth 877 is out of engagement with any of the clutch notches 869 of the clutch tube 868. When the clutch release arm 867 is rocked as a result of the actuation of the operating link 863 at a differential time, the clutch is engaged because a spring 878 attached to clutch pawl 876 will rock the latter in order that the clutch tooth 877 will engage a clutch notch 869 determined by the differential time the operating link 863 is actuated. The above described clutch is the printing type selecting clutch and causes the differential rotation of the printing wheel 860, since the gear 870 and the printing teeth of the type carrying wheel 860 are intergeared.

Figs. 3a and 3b show the arrangement of the total digit printing devices for a single order and the machine is preferably provided with duplicate devices for printing a plurality of digits of the total.

If, as previously described, the operating link 863 was shifted at about 123° as a result of the 5, 3, 0 digit impulses because a readout order represents 9, the clutch release arm 867 would be rocked at this time and pawl 876 would be released and rocked by spring 878 so that clutch tooth 877 engages a clutch notch 869, and printing wheel 860 will thereafter continue to rotate to such position as to present the numeral "9" to the printing line. The differential time at which the operating link 863 is actuated determines the extent of counterclockwise rotation of the printing wheel 860 from a rest position necessary to select a numeral type. After the predetermined extent of rotation of the printing wheel 860 has been effected and the printing impression has been effected, with the type selecting clutch still engaged, the printing wheel 860 will continue to rotate until the free end of the clutch pawl 876 strikes the clutch release arm 867 which, in the meantime, has been brought to its normal position, by means of a compression spring 879 (Fig. 3a). When such disengagement is effected the printing wheel 860 is at the normal position shown in Fig. 3a.

Each printing wheel 860 is carried by an arm 881 loosely pivoted upon a rod 882 and provided with a rearwardly extending follower extension 884 which is operated by a cam projection 883 of a cam disk 885 which constitutes a driven member of a printing clutch.

Shaft 838 rotates a clutch tube 886 fixed thereto and likewise encircling the clutch tube 886 is the driven clutch disk 885 upon which is pivotally mounted a clutch pawl 887. Clutch disk 885 and parts carried thereby are guided similarly to gear 870. Associated with the clutch pawl 887 is a clutch release arm 888. When the clutch engagement is effected between the clutch pawl 887 and one of the clutch notches of the clutch tube 886, the disk 885 will be rotated in a clockwise direction, whereby the cam projection 883 will cooperate with the follower extension 884 to rock arm 881 about the rod 882 against the action of the return spring 889. The engagement of the clutch now being described is effected when the printing control magnet 861 for each order is again energized for numeral printing by an "N" impulse.

When the printing clutch engagement has been effected, each cam 885 will cooperate with the related follower extension 884 to rock the associated printing arm 881 to force the printing wheel 860 against the usual inking ribbon and platen 890 around which platen is positioned the paper strip to be imprinted. As each arm 881 is rocked against the action of the spring 889, the printing wheel 860 is being rotated counterclockwise but since the printing wheel is now rolling over the gear 870 this rolling action will cause an equal and simultaneous rotation in a clockwise direction. Both of these opposite rotations will, in effect, cause the printing wheel to be substantially immobile with respect to its rotation when it moves to the right to strike the platen 890, the type striking the platen squarely and firmly to cause a legible impression.

After the printing operation, when cam extension 883 of the cam disk 885 passes by the follower extension 884, spring 889 will now be effective to return the type wheel carrying arm 881 to normal position and the extension 884 now bears against the circular peripheral edge of the cam disk 885.

After the printing operation, since the type selecting clutch is still engaged, the printing wheel 860 continues to rotate as previously stated until the clutch pawl 876 strikes the clutch release arm 867 which, in the meantime, has been positioned to normal, thereby disengaging the type selecting clutch when the printing wheels are at normal position.

The printing clutch continues its engagement for a complete rotation of the cam 885 and the clutch disengagement is effected by the engagement of the clutch pawl 887 with the clutch release arm 888.

As the free end of the clutch pawl 876 strikes the clutch arm 867 there is a tendency to cause the gear 870 to rebound counterclockwise. This action is prevented by the cooperation of a spring-pressed detent 896 with a shoulder 897 of a plate 898 secured to each gear 870. When the normal position of the clutch is obtained, the detent 896 will engage the shoulder 897 to prevent such rebound and retain the clutch parts in their normal position.

A somewhat similar rebound preventing mechanism is also provided for the printing clutch which consists of a spring-pressed detent 891 cooperating with the shoulder 899 of the cam disk 885.

Upon the transmission of said "N" impulse, by a circuit to be described, the second energization of the magnet 861 again attracts its armature 815 and shifts link 816. The latter thereupon rocks clutch release arm 824 to unlatch the clutch release arm 888 of the printing clutch. At this time a low portion 820c (see Figs. 3a and 6a) of a cam 820 cooperates with the cam follower extension 821 so as not to restrain the rocking of clutch release arm 824. When the clutch release arm 888 is unlatched a depending extension 827 moves in a clearance portion 826 of said arm 824. Cam disk 885 will now rotate counterclockwise and the cam extension 883 will strike the follower extension 884 at the time the selected numeral type is at the printing line to effect the printing impression.

It is undesirable to have the clutch release arm 888 released whenever link 816 is rocked the first time to rock arm 824 to engage the printing wheel clutch and during this time a high portion 837a of cam 837 cooperates with arm 888 to block it against movement to release the printing clutch. When the N pulse is transmitted as will be later described the low portion of cam 837b will cooperate with clutch release arm 888 to permit its rocking to engage the printing clutch. After this the cam rise 837c of cam 837 will function to positively retract the clutch release arm 888 to normal position to cause disengagement of the clutch release pawl 887 after a complete revolution of the printing clutch. At the termination of the operating cycle a cam rise 820d of cam 820 functions to rock the clutch release arm 824 clockwise to again position it beneath the extension 827 of the clutch release arm 888, which previously has been elevated to the position shown in Fig. 3a. The cam rise 820d also shifts link 816 to restore armature 815 to normal if it should stick to the core of magnet 861.

Gear drive for printer

In Fig. 4 reference numeral 838 designates the printing impression drive shaft which is driven at a uniform speed of rotation for each cycle of the operation of the machine. The drive shaft 822 has secured thereto a gear 940 which drives a gear 941 secured to the printing impression drive shaft 838 to rotate the latter at a uniform speed of rotation of one and a half revolutions for each revolution of drive shaft 822.

Shaft 839 represents the type selecting drive shaft which rotates $2\frac{1}{2}$ revolutions for each operating cycle. The shaft 839 is driven at times with a uniform speed of rotation synchronous with the drive shaft, but at other times the speed of rotation given to shaft 839 is decreased or increased with respect to drive shaft 838, in order to select the desired alphabet type of a selected group of alphabet type. This means to effect the variable drive of shaft 839 is disclosed in full detail in Patent No. 2,439,445, issued to H. S. Beattie, and since the alphabet printing is of no concern here it need not be described to understand the present invention. With such variable speed drive the shaft 839 will rotate the type wheel at a decreased speed to present the selected numeral type to the platen at about 330° of the cycle, at which time the previously clutched printing cam 885 will have its cam projection 883 in position to strike the projection 884 to impress the selected numeral type against the platen 890.

The machine includes a driving means driven by the shaft 822 for rotating the cams 800A, 800B, 800C and 800D, 820, 825, 837 and 887 in synchronous relationship and such cams are driven one complete revolution for each operating cycle.

The driving means for driving cams 800A, 800B, 800C and 800D will now be described. Secured to shaft 822 is a gear 1040 (Fig. 4) which, through a gear 1041, drives a gear 1042 secured to the drive shaft 1043 for the cam 800D. Shaft 822 is extended to directly drive the cam 800C. Referring to Fig. 4, gear 1040 through a gear 1044 drives a gear 1045 secured to the drive shaft 1046 for cam 800B. Gear 1045, through an idler gear 1047, drives a gear 1048 secured to the drive shaft 1049 for the cam 800A. By such driving means the cams 800A, 800B, 800C and 800D are driven synchronously.

Referring to Fig. 4 gear 1044 has rotatable therewith a gear 1050 which, through an idler gear 1051, drives a gear 1052 attached to the shaft 1053 to which the cam 825 is secured.

Gear 1050 also meshes with a gear 1054 secured to a shaft 1055 to which shaft the cam 820 is secured.

Also referring to Fig. 4 to drive shaft 838 there is secured a gear 1056 which meshes with a larger gear 1057 secured to a shaft 858 to which shaft the cam 837 is secured.

Thus, through the intergearing last described, the operating cams 820, 825 and 837 are driven synchronously with the operating cams 800A, 800B, 800C and 800D.

Other relays for conditioning machine for total printing and accumulator reset operations These relays are LC, S–, PCC and RN relays and the energizing circuits thereof will be explained as their requirement is needed for the description of the operation of the machine.

At the end of the cycle in which a group number change has been detected CR119 (Fig. 5a) cam contacts close to complete a circuit from line side 615, cam contacts CR119, STR2 relay contacts now closed, S– relay coil to line side 616. CR119 cam contacts keep S– relay closed until about 275° of the cycle during which a total printing and reset occurs. The S– relay closes its S–1 relay contacts, completing a circuit when CR122 cam contacts close between 0–78° of the total printing and reset cycle from line side 615, cam contacts CR122, STR1 relay contacts now closed, S–1 relay contacts now closed, LC relay, to line side 616.

With LC energized total printing takes place in the following manner:

Total printing control circuits

Total printing in the present machine is performed under control of the total readout in conjunction with the combinational code translator described in the section designated "Translator and total digit printing mechanism" which converts the combinational impulse reading derived from the readout sections of the accumulator to a single digit differentially timed equivalent to thereby select a corresponding digit type.

Each readout section comprises, as previously described, a series of digit contact points 661 (Figs. 5b and 5c), a common contact segment 662 and a brush 663 which takes digit positions according to the digit representation of the accumlator order. For simplicity the readouts are shown at digit representing positions which represent a total of –0044. The contact points 661 of like digit values are interconnected by digit impulse transmitting wires 664. In circuit connection with the digit wires 664 marked 9–0 are cam contacts CR97 to CR106, inclusive. These cam contacts transmit combinations of impulses 5, 3, 1, 0 marked alongside of the contacts in Fig. 5a and the timing of the 5, 3, 1, 0 impulses of such contacts is shown in Fig. 6b but the timing for each individual cam contact CR97—CR106 is not shown. Thus, according to the digit representation of the accumulator readout, combinations of impulses 5, 3, 1, 0 are transmitted. For example, if the brush 663 of a readout order is a 9, the cam contacts CR97 close at times to transmit digit impulses 5, 3, 0. CR98 transmits impulses 5, 3, CR99, 5, 1, 0, etc., all as designated on the wiring diagram of Fig. 5a. These impulses are directed by a circuit from line 615, CB circuit breaker contacts, CR102 cam contacts (when 4 is the digit in the units order, for example), INV—Rf relay contacts now normal, the 4 digit wire 664, contact point 661, brush 663, common segment 662, STRU relay contacts now closed (Fig. 5c), LCU relay contacts now transferred, to plug socket 666.

For causing the readout sections to control the related orders of the combinational code translator respective plug connections 667 are made between plug sockets 666 and plug sockets 668. It should also be noted that during 0–90° of the first part of the cycle when cam contacts CR97—106 transmit impulses 5, 3, 0, the LC and STR relays are energized.

Continuing now with the units order, impulses are directed by the related plug connection 667, plug socket 668 (Fig. 5c), through PCCU relay contacts now normal, RNU contacts now normal, translator control magnet 861 of the units order, to line 616. This magnet receives the impulses 3, 0 and as previously described the translator converts the combination of impulses to a 4-digit equivalent to cause the engagement of the type wheel clutch to initiate the rotation of the printing wheel to the 4 digit position. Thus, in each order the combinational impulses 5, 3, 1, 0 are selected by the readout for transmission to the code translator and conversion to a differentially timed digit equivalent. When all printing wheels 860 (Fig. 3a) are at their digit positions printing is effected by transmission of an impulse at the N time.

Figure 5A:
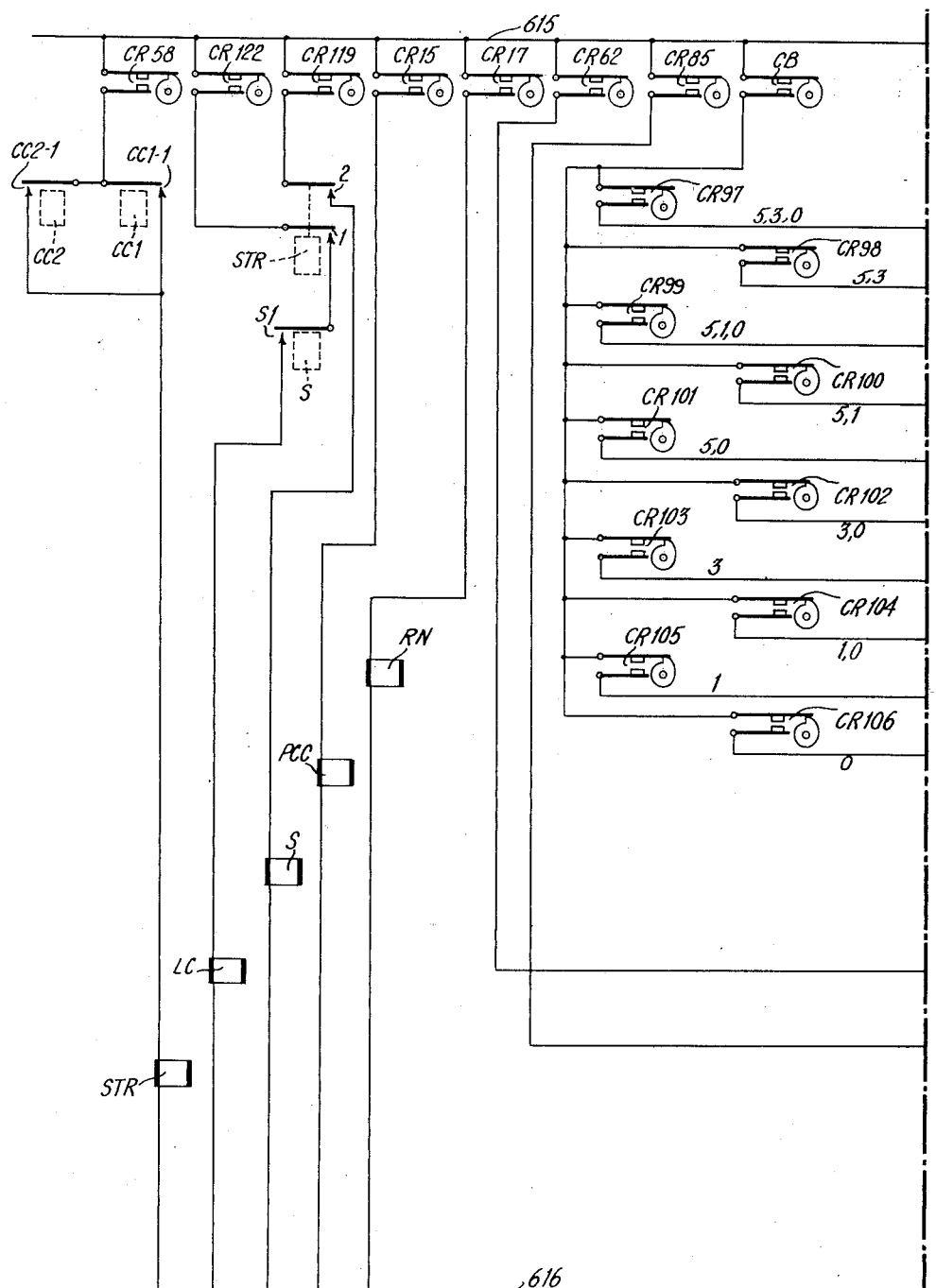

Referring to Fig. 6b at 165° of the cycle cam contacts CR17 close to pick up the RN relay by an obvious circuit (see Fig. 5a). The RN relay transfers the RNU, T, H, TH contacts (Fig. 5c) so that a second impulse is directed to all orders of the translator control magnets 861 by a circuit from line 615, cam contacts CR80, the U, T, H, TH relay contacts of RN relay now transferred, to the respective translator control magnet 861, to line side 615.

Thus, printing of the digits of the total occurs. Of course, for left-hand orders of the readout representing a total digit of 0 the customary zero elimination arrangement prevents printing of such unnecessary zeros. Such feature is not shown herein as it is well known in the art.

*Circuits to effect resetting of accumulator*

The resetting of the accumulator occurs in the same cycle that the total is printed but during the latter part thereof and utilizes differentially timed electrical stop impulses derived from the translator. The start impulses are directed to each start magnet of the accumulator to rotate the accumulator wheel in the additive direction from its digit position to the reset position, which, in the present machine, is the digit 9 position. The stop impulses derived from the translator are directed at such times that the 9 complement of the digit standing on the accumulator wheel is additively entered to thereby bring each wheel to 9.

It is preferable to derive the stop impulses under control of the type wheel clutches, each of which it will be recalled is engaged under control of the combinational impulse translator, so that the engagement of the printing wheel clutch to rotate the printing wheel to a selected digit position is concurrent with the transmission of the stop impulse sent to the stop magnet. Reverting to Figs. 3a and 3b it will be recalled that the combinational code translator causes a movement of the link 863 at differential points in the cycle, as is indicated in Fig. 6a. This causes the engagement of the printing wheel clutch at a differential time and after the engagement is effected type wheel contacts 672 (Fig. 3a) are closed at differential points in the cycle to transmit a stop impulse to the accumulator stop magnet SM of the same order.

Referring to Fig. 3a the plate 898 has an inclined cam edge 670 which cooperates with and rocks the double arm 896 shortly after the clutch engagement has been effected. The lower arm 671 of double arm 896 bears against the top blade of contacts 672. Thus, it is evident that after the engagement of the accumulator wheel clutch the slight clockwise movement of double arm 896 will close contacts 672. This closure occurs, of course, after the clutch has been engaged and the times that contacts 672 are closed to transmit differentially timed impulses 0–9 are shown in Fig. 6a.

Before the circuits for transmitting the stop impulses are explained, the impulsing circuits for energizing the start magnets SM of all denominational orders will first be described. Referring to Fig. 5a, it will be recalled that the S-relay is picked up at the last part of the cycle in which a group number change has been detected and CR119 cam contacts maintain the energization of this relay during the total printing and reset cycle up to about 275°. Therefore, referring to Fig. 5a, when CR85 cam contacts close at about 140° of the cycle a circuit is closed from the line side 615, cam contacts CR85, STR3 relay contacts now closed, through the S–, U, T, H, TH relay contacts now closed (Fig. 5b), to each of the AM start magnets of the four denominational orders of the accumulator shown herein, to line side 616. This will cause the engagement of all accumulator wheel clutches and if any accumulator wheel stands at any other digit position than 9 the rotation of said accumulator wheel will be initiated to bring it by a movement which is the complement of the digit on the wheel to a 9 digit reset position.

During the rotation of the accumulator wheels stop impulses are directed to the SM stop magnets by a circuit now to be described. By an obvious circuit shown in Fig. 5a, when CR15 cam contacts close between 100–315° of each cycle the PCC relay is energized to transfer its U, T, H and TH relay contacts. The stop impulse circuit is from the line 615, through cam contacts CR82 (Fig. 5c) which are closed between 116° and 273° during the differential times that the type wheel contacts 672 are closed, thence through the respective U, T, H or TH relay contact of the PCC relay now transferred, to the plug socket 668, related plug connection 667, plug socket 666, through the respective U, T, H and TH relay contacts of the LC relay now deenergized, to each SM stop magnet, to line 616.

Recalling that it was assumed that the accumulator represented 0044, with the brush 663 standing at the 4 digit position the contacts 672 of this order will be closed at 225°. However, the start impulse directed by CR85 cam contacts will have moved the accumulator wheel from 4 to 9 or five steps at the time that the stop magnet SM receives the impulse from the type wheel contacts 672. Thus, the accumulator wheel will be stopped at the 9 digit position. The operation is the same for the tens order where 4 was assumed to be the total digit representation in this order. However, for the hundreds and thousands orders it was assumed that 0 is represented in each order, which is indicative of a positive or debit balance. The start impulse to the start magnets AM of such orders will initiate the 9 steps of movement. The printing wheel clutch is engaged to rotate print wheel 860 counterclockwise at about the same time that the print wheel arm 881 is rocked to rotate print wheel 860 clockwise, as a result of the N printing impulse. This will cause the printing from the 0 digit type. Engagement of the printing wheel clutch causes a later closure of contacts 672 sending a stop impulse to the SM magnet after the accumulator wheel has rotated nine steps to bring the wheel to the 9 digit position.

If a wheel stands at 9 the closure of contacts 672 to send a stop impulse at about 140° after the print wheel clutch is engaged to select the 9 type is coincident with or slightly earlier than the start impulse transmitted to the AM magnet by CR85 cam contacts. This prevents engagement of the clutch and the wheel remains at 9.

*Automatic total printing cycle after resetting the accumulator*

It has just been described how total printing is effected from the accumulator followed by a resetting of the accumulator in the same cycle. It is desirable to have this operation followed by another total printing cycle after reset to show and prove that the accumulator has been brought to a reset position. By any suitable program means the second printing cycle may be performed automatically and then terminated. A preferred form of program initiating means is shown in the circuit diagram.

It will be recalled that as a result of a minor group change the minor total taking relay closes the MI—4 contacts (Fig. 5d) so that when the CR48 transmits an impulse the P1 relay is energized and held energized through CR50 cam contacts. The CC1 relay is also energized. Before CR50 cam contacts open during the total printing and reset cycle CR47 cam contacts close so as to complete a circuit from the line side 615, through cam contacts CR47, relay contacts P1—2 now closed, the pickup coil of the P2 program relay to the line side 616. P2 is also held energized through the P2—1 stick contacts and cam contacts CR50. During this cycle CR47 cam contacts close before P2 relay is deenergized to complete a circuit from line side 615, through CR47 cam contacts P2—2 relay contacts now closed to the pickup coil of P3 relay to the line side 616. The P3 relay is held energized through the P3—1 stick contacts and CR50 cam contacts. P3—1 contacts also pick up the CC2 relay and the latter is held energized to automatically effect another total printing cycle. In Fig. 5a it will be seen that the CC2 relay closes the CC2—1 contacts, thereby picking up the STR relay which performs the total and reset operation previously described.

It is explained that the complementary movement given to each accumulator wheel to bring it to a reset position also moves readout brush 663 of the same order a corresponding extent so that if the accumulator wheel comes to the reset or 9 digit position the brush 663 will, of course, also come to the 9 digit position, resting on the 9 segment 661, and the units carry control contacts 739 and 741 (Fig. 5b) will be in contact with each other in each order. Understanding now that in this particular accumulator arrangement a reset position of all orders of the accumulator is reflected by the setting of brushes 663 on the 9 digit contacts, it will be obvious that if a total was taken with the readout setting at 9's in all orders, the total that would be printed by the printing mechanism after a reset of the accumulator would be a series of 9 digits, which is incorrect. Accordingly, switching devices are interposed between the wires 661 and cam contacts CR97—CR106 so as to transmit impulses which will transmit 9's complementary impulses, and in the case of the 9 digit would be the 0 impulse.

In the total taking operation now being described it is assumed that only additive items have been entered but if subtractive items are also entered they will not be of such numerical magnitude to cause the representation of a negative balance in the accumulator, and thus a positive balance will be indicated. To this end the machine is conditioned for "Negative Balance OFF" which is effected by a plug connection 620 (Fig. 5d). This plug connection enable the testing of all accumulator orders for 9's to accordingly prove a zero condition after reset. This arrangement also enables the use of the highest order wheel for accumulating the digits entered in this order and thus enables the maximum accumulating capacity of the accumulator. It should be noted that for "Negative Balance OFF" conditions the readout of this order is not utilized to detect a zero balance (or 9 digit representation in each order) since it is transferred to the transfer contacts 739—741 of all orders. This detection is effected by a circuit from the line side 615, through cam contacts CR62 (Fig. 5a) serially through 739—741 contacts for all orders, wire 619 (Figs. 5c, 5d), plug connection 620, wire 622 to the pickup coil of the INV—R relay to the line side 616. The INV relay is held energized through the INV—R—1 relay contacts and cam contacts CR69 to line side 615. If all of the accumulator elements have come to a 9 reset digit position this circuit will be completed and the INV—R relay (Fig. 5c) will be held energized through the following total taking cycle after reset.

Figure 5B:
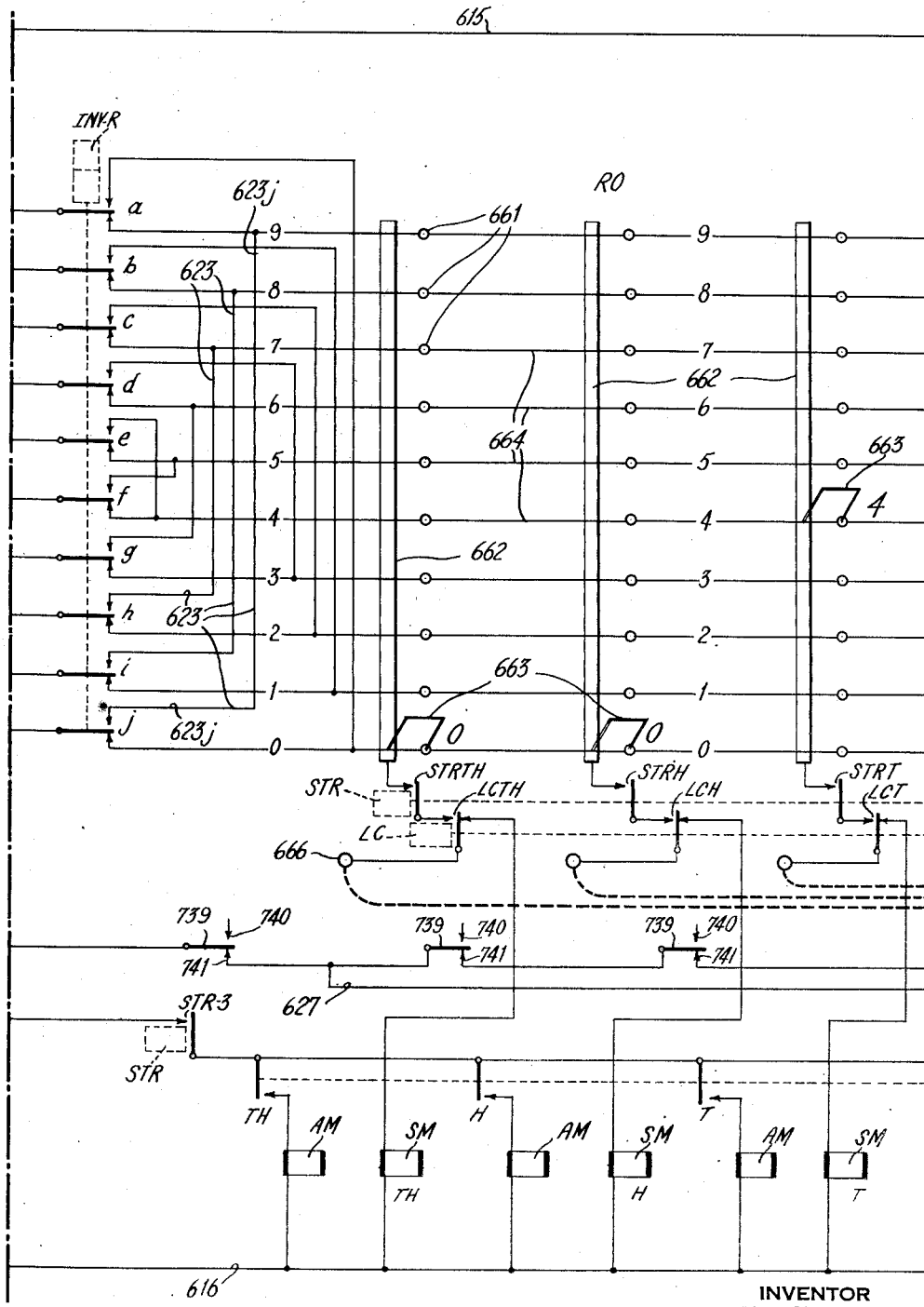
Figure 5C:
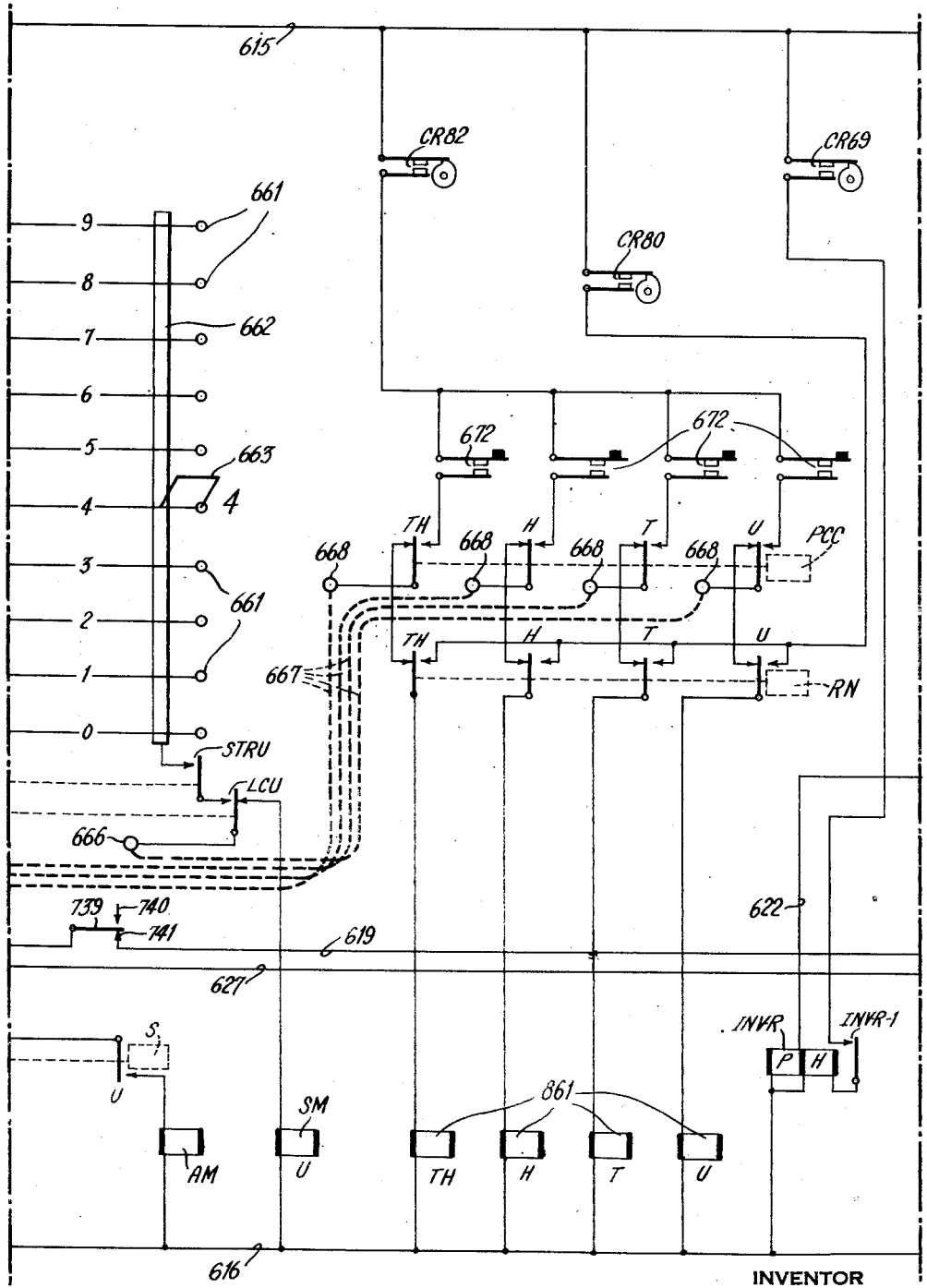
Figure 5D:
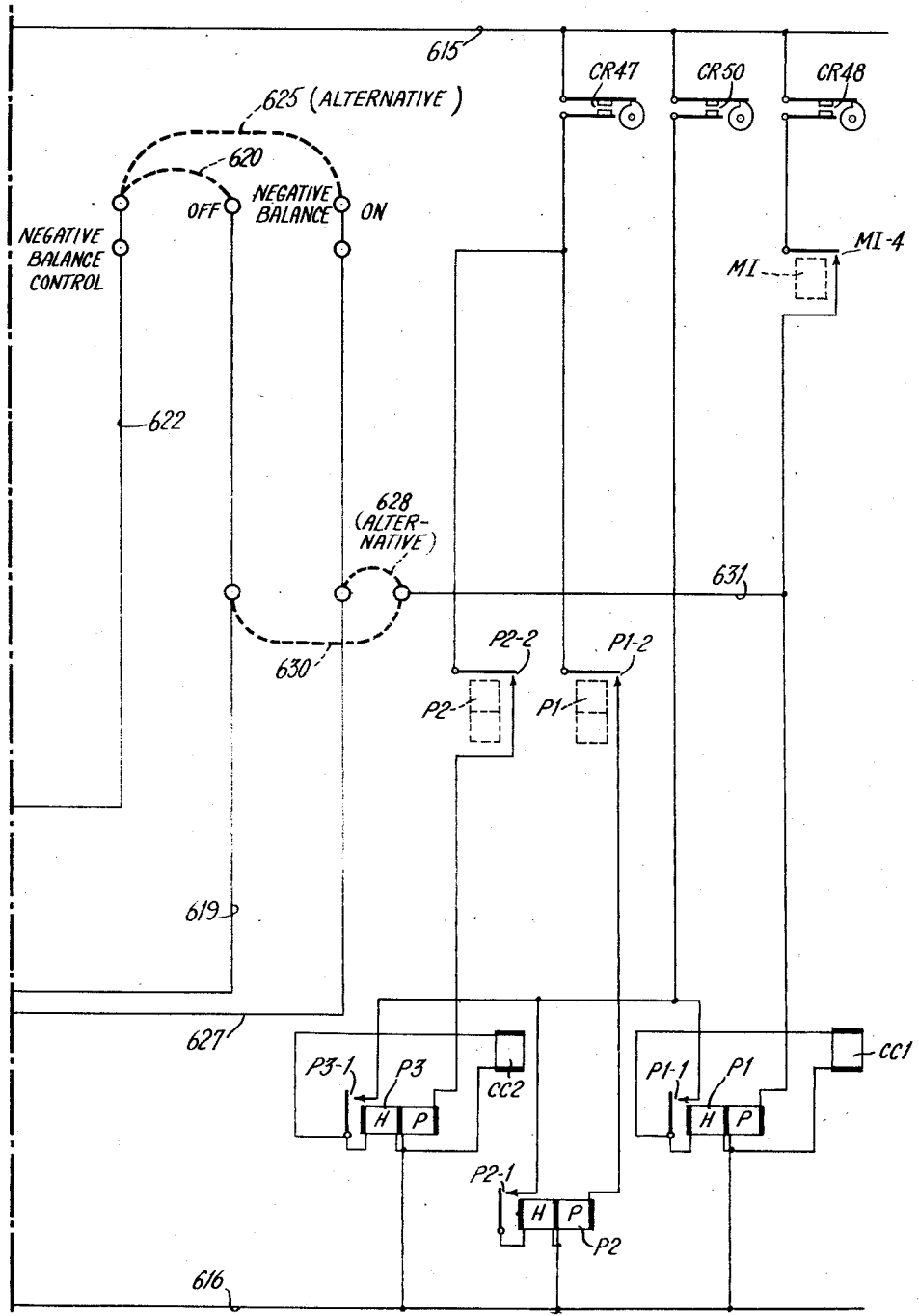

Referring now to Fig. 5b the INV—R relay closes the a, b, c—j contacts so as to change the relationship between cam contacts CR97—CR106 and the wires 661 of the readout. This change in relationship is effected by the inversion wiring 623 so arranged that 9's complementary impulses are transmitted. Assuming now that all orders of the accumulator have come to the 9 digit representing position, the CR106 cam contacts will transmit a 0 impulse through the INV—Rj relay contacts and wire 623j to the 9 digit wire 661. Hence, such 0 impulse will be transmitted to the translator and converting mechanism which will result in the printing of the digits 0 in each order.

After the zero condition proving printing operation a reset operation will be performed but since all of the readout orders now stand at 9 there will be no engagement of the accumulator clutches, and the accumulator wheels will remain at 9, as has previously been described.

Summarizing, the "Negative Balance OFF" feature enables the maximum accumulating capacity of an accumulator group to be utilized, and because the accumulator readout orders reset to 9 digit position the selection of the inversion relay to prove the reset condition of the accumulator after a reset is placed under control of the transfer contacts, thus freeing the highest order accumulating position so that true figures including up to 9 in that position can be accumulated. Thus, an accumulator having four denominational positions can accumulate a total representing up to −9998. After a reset operation it will represent −9999−, proving a zero condition, and −0000− will be printed due to the function of the inversion control relay INV—R.

*Negative balance "ON"*

The "Negative Balance ON" condition of the machine is used when the entry of additive and subtractive items would result in a negative balance which is indicated by a 9 digit position in the highest denominational order. The highest denominational order of the accumulator is reserved for this detection but the indication of a nines complement is signified by the closure of contacts 739—741, associated with the highest denominational order. Because a negative balance is represented by the nines complement of the true digits, the inversion relay is selected for operation before a reset operation under control of the contacts 739—741 of that order. For a "Negative Balance ON" condition the plug connection 620 is removed and a plug connection 625 (Fig. 5d) is made.

Upon a change in group numbers an automatic total taking operation ensues, as previously described, which results in the energization of the CC1 relay to initiate an automatic total printing and reset operation. At the end of the cycle in which a group number change is detected, cam contacts CR62 close, thereby closing the circuit from the line 615, contacts CR62, transfer contacts 739—741 of the highest denominational order, wire 627 (Figs. 5b, 5c, 5d) to the "Negative Balance ON" plug socket, said plug connection 625, wire 622, the pickup coil of the INV—R relay to the line side 616. Hence, in taking a total from the accumulator which represents a negative balance, the energization of the inversion relay INV—R will cause nines complementary impulses of the digit reading on the readout RO to be transmitted to the translator control magnets 861. This inversion causes the selection of the digits on the printing wheel which are the nines complement of the digit standing on the readout, thereby printing the true digits of the negative total. For example, if the negative balance was represented on the readout as –9821– the nines complementary digit of each digit of the negative balance would be printed as –0178–.

Following the true digit balance printing of a negative balance there will be a reset of the accumulator in the manner previously described, resulting in the reset in each order of the readout and accumulator to the 9 digit position.

Also in the manner previously described, there will be a following total printing cycle after reset and since all readout orders are at 9 the balance will be printed as –0000–, thereby proving a zero condition. In this operation contacts 739—741 of the highest order will again select the inversion relay INV—R for operation.

*Automatic total printing with negative balance "ON" condition*

It is explained that it is not necessary in the present machine to effect printing of a negative balance as a true number until there is a group control change because late in each cycle CR62 cam contacts determine whether a subtracted amount changes a balance from positive to negative. If it finds this to be so the impulse will be directed from wire 627, to the conversion relay INV—R through plug wire 625 and also by a plug wire 628 (Fig. 5d), wire 631, the pickup coil of the P1 relay, to the line side 616; thus the program will be automatically initiated by the negative belance condition of the accumulator, and the negative balance converted to a true number. It is understood, of course, that this is an alternative control replacing the one effected by a group number change.

*Automatic total printing with negative balance "OFF" conditions*

By conditioning the machine in a certain manner it is also not necessary to wait for a group control change to print a total when the machine is conditioned for "Negative Balance OFF" and a zero balance is ascertained. It is desirable that when the accumulator comes to a zero balance condition (when the accumulator represents –99999–) there be an automatic taking of such balance and then a reset of the accumulator. To this end a plug connection 630 is made. The CR62 cam contacts test in each cycle the position of the transfer contacts 739—741 for all denominational orders and if, at any time, the accumulator represents –9999– after the entered positive and negative amounts, the impulse is directed through all the contacts 739—741 in serial order, to the wire 619, plug connection 620 to the INV—R relay, and also by a plug wire connection 630, wire 631, to the P1 relay. This, as previously described, will initiate a total printing and reset cycle and since the inversion relay INV—R is now energized the zero balance will be printed as –0000–. If the machine is conditioned to effect a subsequent total printing cycle after reset to prove a zero condition, it will be merely a repetition of the operations in the previous cycle.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In an adding and subtracting accounting machine, an accumulator wherein negative amounts are adapted to be entered as complements and additive amounts as true digits and said accumulator represents by a 9 in the highest denominational order a negative balance condition when negative amounts exceed the additive amounts numerically, printing means, total taking means including conversion means associated with said accumulator for converting the negative balance amount to true digit representations and causing said printing means under control of said accumulator to print a negative balance as a true number, means for sensing the presence of a 9 in the highest order after entry of each number for ascertaining a negative balance condition in said accumulator, means under control of said sensing means and responsive to the presence of 9 as a result of an entry operation which changes said accumulator from a positive balance condition to a negative balance condition, and means controlled by said responsive means upon detection of a negative balance to cause the automatic operation of said total taking means and said conversion means for converting the negative balance amount to true digit representations and to cause said printing means under control of said accumulator to print the negative balance as a true number balance amount.

2. In an adding and subtracting accounting machine, an accumulator of the type having electrical transfer contacts and a reset digit position at all 9's and wherein a zero balance is indicated by all 9's and closure of the transfer contacts of all denominational orders when negative amounts equal the additive amounts numerically, printing means under control of said accumulator, means for converting the 9's in all denominational orders of said accumulator representing a zero balance to all 0's for proving a zero balance, means comprising said transfer contacts of all denominational orders for detecting when they are all closed a zero balance on said accumulator after the entry of a positive or negative amount which causes the accumulator to represent a zero balance, and means controlled by said closed transfer contacts of all denominational orders for causing the detecting means to select said conversion means for operation for converting all 9's on the accumulator to all 0's in order to cause said printing means under control of said accumulator to print a zero balance as all 0's.

3. In an adding and subtracting accounting machine, an accumulator wherein negative amounts are adapted to be entered as complements and additive amounts as true digits and said accumulator represents a negative balance condition when negative amounts exceed the additive amounts numerically, and said accumulator represents a zero balance when negative amounts equal the additive amounts numerically, means for reading out said accumulator, printing means under control of said accumulator reading out means, means for detecting a negative balance condition in said accumulator after entry of a negative number which changes said accumulator to a negative balance condition, means for detecting a zero balance after the entry of a positive or negative amount which causes the accumulator to represent a zero balance, and means for selectively causing the first named detecting means upon detection of a negative balance to automatically cause said accumulator reading out means to control said printing means to print said negative balance as a true number balance amount, or for causing said second named detecting means upon detection of a zero balance to automatically cause said reading out means to control said printing means to print all 0's to represent a zero balance.

4. In an adding and subtracting accounting machine, an accumulator, wherein negative amounts are adapted to be entered as complements and additive amounts as true digits and said accumulator represents by a 9 in the highest denominational order a negative balance condition when negative amounts exceed the additive amounts numerically, and said accumulator represents a zero balance when negative amounts equal the additive amounts numerically, means for reading out said accumulator, printing means under control of said accumulator reading out means, means for detecting the standing of 9 in said highest denominational order for detecting a negative balance condition in said accumulator after entry of a negative number which changes said accumulator to a negative balance condition, conversion means for causing the negative balance amount on said accumulator to be read out by said reading out means as a complement thereof, means for detecting a zero balance after the entry of a positive or negative amount which causes the accumulator to represent a zero balance, and means for selectively causing the first named detecting means upon detection of a negative balance to select said conversion means for operation and automatically cause said accumulator reading out means to control said printing means to print said negative balance as a true number balance amount, or for causing said second named detecting means upon detection of a zero balance to automatically cause said reading out means to control said printing means to print all 0's to represent a zero balance.

5. In an adding and subtracting accounting machine, an accumulator, wherein negative amounts are adapted to be entered as complements and additive amounts as true digits and said accumulator represents by a 9 in the highest denominational order a negative balance condition when negative amounts exceed the additive amounts numerically, and said accumulator represents by 9's in all denominational orders a zero balance when negative amounts equal the additive amounts numerically, means for reading out said accumulator, printing means under control of said accumulator reading out means, means for sensing the standing of 9 in said highest denominational order for detecting a negative balance condition in said accumulator after entry of a negative number which changes said accumulator to a negative balance condition, means for sensing the standing of 9's in all denominational orders for detecting a zero balance after the entry of a positive or negative amount which causes the accumulator to represent a zero balance, conversion means for causing the negative balance amount in said accumulator to be read out by said reading out means as a complement thereof or all 9's on said accumulator representing a zero balance as 0's, and means for selectively causing the first named sensing means upon detection of a negative balance to select said conversion means for operation and automatically cause said reading out means to control said printing means to print said negative balance amount as a true number balance amount, or for causing said second named sensing means upon detection of a zero balance to automatically select said conversion means for operation to cause said reading out means to control said printing means to print all 0's to represent a zero balance.

6. In an adding and subtracting machine, an accumulator of the type having a 9 digit reset position in all orders after a reset operation and having the highest denominational order reserved for representing by a standing at 9 a negative balance, negative and positive amounts being entered in said accumulator in all orders except said highest order when the machine is conditioned for a "Negative Balance ON" condition, and in all orders for a "Negative Balance OFF" condition, when a positive balance is expected, conversion means for causing said accumulator to be read out as a nines complement of each digit, a plurality of "9" digit representing devices, one for each accumulator order, and selective means for conditioning the machine for a "Negative Balance ON" condition for causing the device of highest denominational order when it stands at 9 for representing a negative balance to select said conversion means for operation before a balance printing and reset operation under control of said accumulator, or for conditioning the machine for a "Negative Balance OFF" condition for causing said devices of all denominational orders to select said conversion means for operation after a balance printing and reset operation for reading out under control of said accumulator the 9 digit standing on all orders of said accumulator and including the denominational order which is reserved for detection of a negative balance, as all 0's to prove the 9 digit reset position, or the zero balance.

7. In an adding and subtracting machine having an accumulator of the type which is reset to a 9 digit position and wherein a negative balance is indicated by a 9 in the highest denominational order and a zero balance by 9's in all denominational orders, said machine having a total taking and reset mechanism operable to take in one cycle a total from said accumulator whether it represents a positive or negative balance and thereafter reset the same and in a successive cycle to take a total from the reset accumulator to prove the zero balance, conversion means associated with said accumulator for converting the negative balance amount to true digit representations, or for converting the 9's in all denominational orders representing a zero balance to all 0's for proving a zero balance, and selective control means for conditioning the machine for a "Negative Balance ON" condition to select said conversion means for operation before a total taking and reset operation for converting the negative balance amount to true digit representations, or for conditioning the machine for a "Negative Balance OFF" condition to select said conversion means for operation after a total taking and reset operation for converting all 9's on the accumulator to all 0's in order to prove a zero balance.

8. In an adding and subtracting machine having an accumulator of the type which is reset to a 9 digit position and wherein a negative balance is indicated by a 9 in the highest denominational order and a zero balance by 9's in all denominational orders, said machine having a total taking and reset mechanism operable to take in one cycle a total from said accumulator whether it represents a positive or negative balance and thereafter reset the same and in a successive cycle to take a total from the reset accumulator to prove the zero balance, means for sensing a "9" in the highest denominational order for detecting a negative balance, means for sensing 9's in all orders for detecting a zero balance, conversion means associated with said accumulator under control of said first named sensing means for converting the negative balance amount to true digit representations, or under control of said second named sensing means for converting the 9's in all denominational orders representing a zero balance to all 0's for proving a zero balance, and selective means for conditioning the machine for a "Negative Balance ON" condition to cause said first named sensing means to select said conversion means for operation before a total taking and reset operation for converting the negative balance amount to true digit representations, or for conditioning the machine for a "Negative Balance OFF" condition to cause said second named sensing means to select said conversion means for operation after a total taking and reset operation for converting all 9's on the accumulator to all 0's in order to prove a zero balance.

9. In an accounting machine, a denominationally ordered readout accumulator, each of said accumulator elements having a 9 digit position when reset to 0 and the highest ordered element being reserved for representing a negative balance condition, a readout commutator adjustable in accordance with digits standing on the accumulator, an emitter adapted to transmit impulses under control of said readout commutator, circuit shifting devices adapted to cause said emitter to send impulses which are the nines complement of the digits standing on said accumulator, means for testing each of said accumulator elements to determine if they all have a 9 digit position, means for connecting said circuit shifting devices for control by said highest order element to cause said emitter under control of said readout commutator to transmit nines complement impulses of a negative balance when said highest order element represents a negative balance condition, and alternative means for connecting said circuit shifting devices for control by said testing means to cause, when all accumulator elements have a 9 digit reset position, said emitter under control of said readout commutator to transmit nines complement impulses of the 9 digit standing on each accumulator element (or 0 impulses) including the commutator order associated with the accumulator element reserved for representing a negative balance.

EDWARD J. RABENDA.

REFERENCES CITED

The following references are of record in the file of this patent:

UNITED STATES PATENTS

| Number | Name | Date |
|---|---|---|
| 2,224,769 | McDowell | Dec. 10, 1940 |
| 2,399,755 | Mills et al. | May 7, 1946 |
| 2,438,081 | Watson et al. | Mar. 16, 1948 |
| 2,493,858 | Carroll et al. | Jan. 10, 1950 |